(12) United States Patent
Bentubo et al.

(10) Patent No.: US 9,684,894 B2
(45) Date of Patent: Jun. 20, 2017

(54) METHOD AND APPARATUS FOR INVOKING A DEGRADED MODE ARCHITECTURE

(71) Applicant: Bank of America Corporation, Charlotte, NC (US)

(72) Inventors: Michelle Bentubo, Orlando, FL (US); Debashis Choudhury, Dallas, TX (US); Therese J. Willis, Apopka, FL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/521,675

(22) Filed: Oct. 23, 2014

(65) Prior Publication Data

US 2016/0117663 A1 Apr. 28, 2016

(51) Int. Cl.
G06Q 20/00 (2012.01)
G06Q 20/20 (2012.01)
G07F 19/00 (2006.01)
G06Q 20/04 (2012.01)
G07G 1/00 (2006.01)
G07G 1/14 (2006.01)

(52) U.S. Cl.
CPC ......... *G06Q 20/202* (2013.01); *G06Q 20/042* (2013.01); *G06Q 20/204* (2013.01); *G07F 19/202* (2013.01); *G07F 19/211* (2013.01); *G07G 1/0009* (2013.01); *G07G 1/14* (2013.01)

(58) Field of Classification Search
CPC .................................................. G06Q 20/202
See application file for complete search history.

(56) References Cited

U.S. PATENT DOCUMENTS 8,688,579 B1* 4/2014 Ethington .............. G06Q 40/02
705/35
2006/0212391 A1* 9/2006 Norman ................. G06Q 20/10
705/40

(Continued)

OTHER PUBLICATIONS

Garcia-Yap, Alileen, "BPI goes offline," Aug. 14, 2013, Inquirer News.*

*Primary Examiner* — Scott Zare
(74) *Attorney, Agent, or Firm* — Weiss & Arons LLP; Michael A. Springs, Esq.

(57) ABSTRACT

An apparatus for invoking a degraded mode architecture is provided. The apparatus may include a desktop application, a branch processor, and/or a data center. The branch processor may be in communication with the data center and the desktop application. The branch processor may transmit activities that occurred in the branch processor and the desktop application to the data center. During a termination of communication between the data center and the branch processor, the branch processor may save branch processor activities and desktop application activities. After the termination of communication, the branch processor may transmit the saved activities to the data center. In addition, many components which may be found on the desktop application may also be found on the branch processor. This may enable the branch processor to perform the desktop application capabilities when there is a termination of communication between the desktop application and the branch processor.

14 Claims, 9 Drawing Sheets

(56) References Cited

U.S. PATENT DOCUMENTS

| | | | |
|---|---|---|---|
| 2013/0159191 A1* | 6/2013 | Maiya | G06Q 20/4016 |
| | | | 705/44 |
| 2013/0290407 A1* | 10/2013 | Maiya | G06Q 40/02 |
| | | | 709/203 |
| 2015/0026055 A1* | 1/2015 | Calman | G06Q 40/02 |
| | | | 705/42 |

* cited by examiner

METHOD AND APPARATUS FOR INVOKING A DEGRADED MODE ARCHITECTURE

FIELD OF TECHNOLOGY

This application relates to computer architecture. More specifically, this application relates to invoking degraded mode architecture during a termination of communications.

BACKGROUND OF THE DISCLOSURE

Many computer system architectures include many external and internal lines of communications. These lines of communications may be wired, wireless, or use any other suitable communication methods, or some combination of all three.

In the past, many computer architectures have become non-functional or partially non-functional during a termination of internal or external communications.

Many times, it would be beneficial for the computer system to remain at least partially functional, despite the terminated communications. Therefore, a need exists for a computer system architecture which can operate in a degraded mode.

SUMMARY OF THE INVENTION

An apparatus for invoking degraded mode architecture is provided. The apparatus may include a branch processor. The branch processor may include a branch processor application server. The branch processor application server may perform computing and networking activities. The branch processor may also include a branch processor electronic journal. The branch processor electronic journal may save activities performed by the branch processor application server. The branch processor may also include a process-monitor. The processor monitor may monitor a condition of the branch process.

The branch processor may also include a device application services registry. The registry may determine what types of devices are available. The registry may also determine what is available inside each device—e.g. in a cash recycler device, what are the denominations of currency that are available.

The branch processor may also include device services for local configuration. The device services for local configuration may implement device information and user permissions pertaining to a plurality of shared devices. Permissions may be granted to a manager to use all the shared devices. A teller may only be granted permissions to use specific devices he may need.

The branch processor may also include a branch processor device manager. The branch processor device manager may associate the plurality of branch processor drivers with the branch processor device services for local configuration.

The branch processor may also include a plurality of branch processor drivers. The drivers may interact with the plurality of shared devices and the branch processor device manager.

The branch processor may also include a branch processor hardware-device exception handler. The branch processor hardware-device exception handler may manage exceptions in the shared devices.

The apparatus may also include a desktop application. The desktop application may include a workstation. The workstation may perform user functions, administrative functions, and any other suitable functions. The workstation may include a browser and an interface layer, as well as any other suitable components.

The desktop application may also include an optical character recognition ("OCR") image processor.

The desktop application may also include an application for converting an image to an image replacement document ("IRD").

The desktop application may also include desktop application device services for local configuration. The desktop application may also include a desktop application device manager and a desktop application hardware-device exception handler.

The desktop application may also include a plurality of desktop application drivers. Each of the drivers may interact with at least one of the plurality of shared devices. Each of the drivers may also interact with the desktop application device manager.

The apparatus may also include a data center. The data center may include a data center hardware device exception handler.

The data center may also include a universal landing zone ("ULZ"). The ULZ may accept an IRD.

The data center may also include a data center server, a data center electronic journal, and a data center application server.

The data center application server may interact with a customer data store, a customer event hub ("ECH"), an image database ("Strata"), an associate entitlement database, and a location based associate entitlement database.

The apparatus may be configured to operate in a first state. In the first state, the branch processor application server may be fully operational.

The first state may allow for many communications to occur between components of the branch processor, the desktop application(s) and branch processor. The lines of communication may place the workstation in communication with the data center application server. The lines of communication may also place the workstation in communication with the branch processor application server.

The lines of communication may also place the device application services registry in communication with the desktop application device services for local configuration.

The lines of communication may also place the desktop application hardware-device exception handler in communication with the data center hardware device exception handler.

The lines of communication may also place the branch processor hardware-device exception handler in communication with the data center hardware-device exception handler.

The lines of communication may also place the application for converting an image to an IRD in communication with the ULZ.

The lines of communication may also place the process-monitor in communication with the data center application server.

In the first state, the data center electronic journal may receive activities that occurred in the desktop application, via the data center application server and the workstation. The data center electronic journal may save the received activities.

The apparatus may also be configured to operate in a second state. In the second state, the branch processor application server may operate with limited capabilities.

In the second state, there may be limited communication between the data center and the branch processor, and the data center and the desktop application.

The second state may include lines of communication between the branch processor and the desktop application. The lines of communication may place device application services registry and the desktop application device services for local configuration.

The lines of communication may also place the workstation in communication with the branch processor application server.

In the second state, the branch processor electronic journal may receive activities that occurred in the desktop application, via the branch processor application server.

In the second state, the branch processor electronic journal may also receive activities that occurred in the branch processor, via the branch processor application server and the workstation.

In the second state, the electronic journal in the branch processor may save the received activities.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
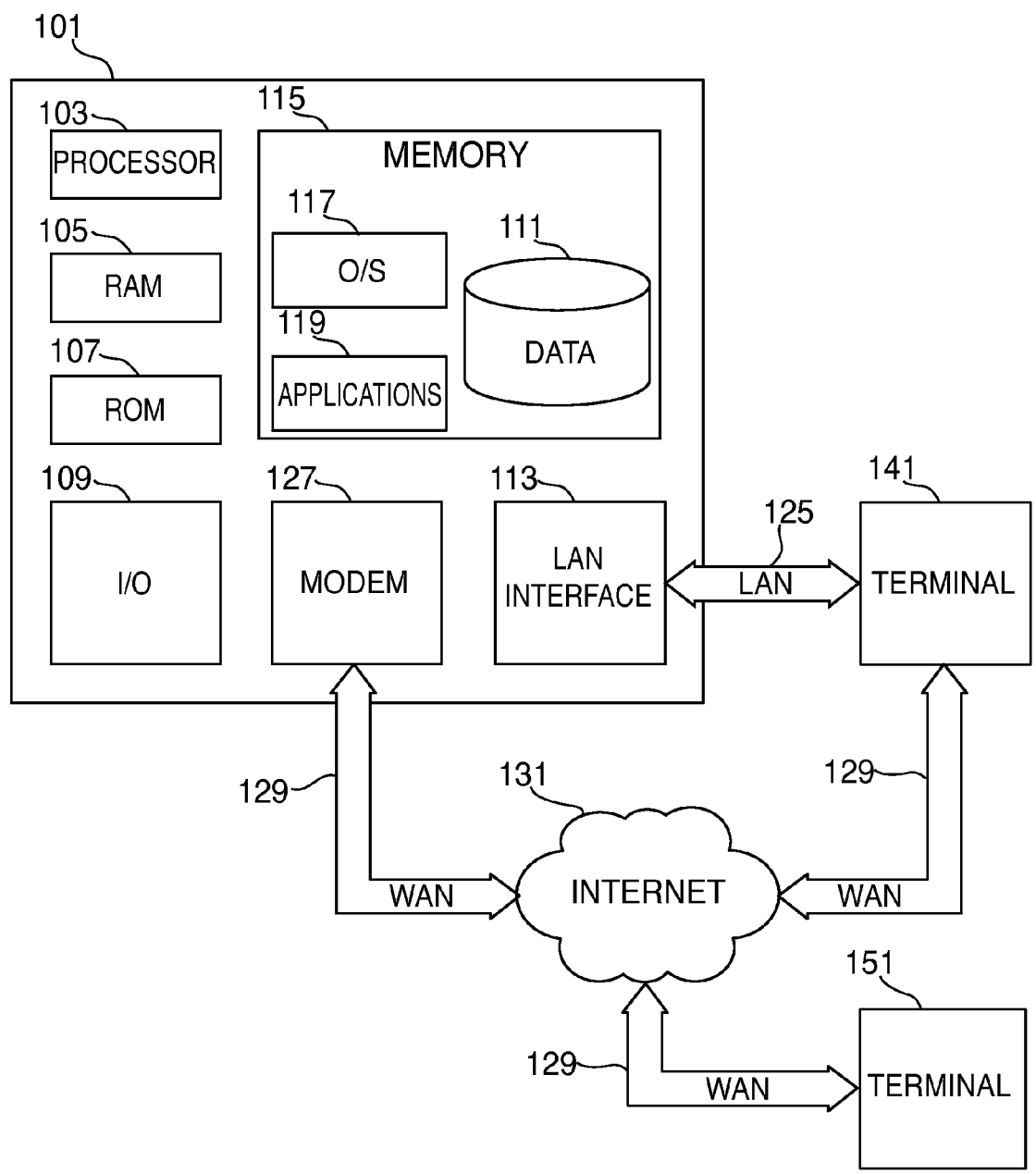
FIG. 1 shows an illustrative apparatus in accordance with principles of the invention.

An apparatus for invoking degraded mode architecture is provided. The apparatus may include a branch processor. The branch processor may include a branch processor application server. The branch processor application server may perform computing and networking activities. The branch processor may also perform any other suitable activities.

The branch processor may also include a branch processor electronic journal. The branch processor electronic journal may save activities performed by the branch processor application server. The electronic journal may save any transactions that occurred—e.g. deposits, withdrawals, retrieval of account information, etc. The information stored about each transaction, in the electronic journal, may be information that the United States Federal Government requires financial institutions to save regarding transactions.

The branch processor may also include a process-monitor. The processor monitor may monitor a condition of the branch processor. The monitoring may ensure that the processor is running properly. The monitoring of the processor may also include a nightly refresh, or reboot of the processor. The nightly refresh/reboot may ensure processor health.

The branch processor may also include a device application services registry. The registry may determine what types of devices are available for use. The registry may also determine what is available inside each device—e.g. in a cash recycler device, the denominations of currency that are available.

The branch processor may also include branch processor device services for local configuration. The branch processor device services for local configuration may implement device information and user permissions pertaining to a plurality of shared devices. For example, permission may be granted to a manager to use all the shared devices, while a teller may only be granted permissions to use a subset of the shared devices.

The shared devices may include a card swipe, a numeric input, and a pin pad. The shared devices may also include a check scanner. The shared devices may also include a receipt printer. The shared devices may also include a cash dispenser and/or cash recycler.

The branch processor may also include a branch processor device manager. The branch processor device manager may associate the plurality of branch processor drivers with the branch processor device services for local configuration.

The branch processor may also include a plurality of branch processor drivers. The drivers may interact with the plurality of shared devices and the branch processor device manager.

The branch processor may also include a branch processor hardware-device exception handler. The branch processor hardware-device exception handler may manage exceptions in the shared devices. Exceptions may include a jammed device, a printing device out of paper, a cash device out of cash, etc.

The apparatus may also include a desktop application. The desktop application may include a workstation. The workstation may perform user functions, administrative functions, and any other suitable functions. The workstation may include a browser and an interface layer, as well as any other suitable components.

The desktop application may also include an optical character recognition ("OCR") image processor.

The desktop application may also include an application for converting an image to an image replacement document ("IRD").

The desktop application may also include desktop application device services for local configuration. The desktop application may also include a desktop application device manager. The desktop application may also include a desktop application hardware-device exception handler.

It should be appreciate that the components which are found on the desktop application may be identical to components on the branch processor. The identical components may perform substantially identical services, which have been described above in connection with the branch processor.

The desktop application may also include a plurality of desktop application drivers. Each of the drivers may interact with at least one of the plurality of shared devices. Each of the drivers may also interact with the desktop application device manager.

The apparatus may also include a data center. The data center may include a data center hardware device exception handler.

The data center may also include a universal landing zone ("ULZ"). The ULZ may accept an IRD.

The data center may also include a data center server, a data center electronic journal, and a data center application server.

The data center electronic journal may save substantially all transactions that occur in substantially all branch processors with which it communicates.

The data center application server may recognize where, and how much money can be found in substantially all devices.

The data center application server may interact with a customer data store, ECH, Strata, an associate entitlement database, and a location based associate entitlement database.

It should be appreciated that many components which may be found on the desktop application may also be found on the branch processor. These components may include the hardware-device exception handler, the device manager, the device services for local configuration, the drivers, and any other suitable components. Because the components reside on the branch processor as well as the desktop application, the branch processor may perform desktop application capabilities when there is a termination of communication between the desktop application and the branch processor.

The apparatus may be configured to operate in a first state. In the first state the branch processor application server may be fully operational.

The first state may allow for many communications to occur between components of the branch processor, desktop application and branch processor. The lines of communication may place the workstation in communication with the data center application server. The lines of communication may also place the workstation in communication with the branch processor application server.

The lines of communication may also place the device application services registry in communication with the desktop application device services for local configuration.

The lines of communication may also place the desktop application hardware-device exception handler in communication with the data center hardware device exception handler.

The lines of communication may also place the branch processor hardware-device exception handler in communication with the data center hardware-device exception handler.

The lines of communication may also place the application for converting an image to an IRD in communication with the ULZ.

The lines of communication may also place the process-monitor in communication with the data center application server.

In the first state, the data center electronic journal may also receive activities that occurred in the desktop application, via the data center application server and the workstation.

The data center electronic journal may save the received activities, in the first state.

The apparatus may also be configured to operate in a second state. In the second state, the branch processor application server may operate with limited capabilities.

The second state may triggered, in response to a termination of communication, between the branch processor and data center, and the desktop application and the data center.

In the second state, there may be limited communication between the data center and the branch processor, and the data center and the desktop application.

The second state may include lines of communication between the branch processor and the desktop application. The lines of communication may place device application services registry in communication with the desktop application device services for local configuration.

The lines of communication may also place the workstation in communication with the branch processor application server.

In the second state, the branch processor electronic journal may receive activities that occurred in the desktop application, via the branch processor application server.

In the second state, the branch processor electronic journal may also receive activities that occurred in the branch processor, via the branch processor application server and the workstation.

In the second state, the electronic journal in the branch processor may save the received activities.

The apparatus may also be configured to operate in a third state. In the third state, the branch processor application is fully operational. The apparatus may operate in the third state after the second state. The operation of the apparatus in the third state may be in response to a renewal of communication between the data center and the branch processor, and the data center and the desktop application.

The second state may include many lines of communication between the branch processor, the desktop application, and the data center. The lines of communication may place the workstation in communication with the data center application server. The lines of communication may also place the workstation in communication with the branch processor application server.

The lines of communication may also place the device application services registry in communication with the desktop application device services for local configuration.

The lines of communication may also place the desktop application hardware-device exception handler in communication with the data center hardware device exception handler.

The lines of communication may also place the branch processor hardware-device exception handler in communication with the data center hardware-device exception handler.

The lines of communication may also place the application for converting an image to an IRD in communication with the ULZ.

The lines of communication may also place the process-monitor in communication with the data center application server.

In the third state, the branch processor electronic journal may transmit the saved activities to the data center electronic journal. The data center may save the received activities. The data center electronic journal may be configured to recognize that the received activities were not received in real-time; rather the received activities occurred while the apparatus operated in the second state, when there was no communication between the data center and the branch processor.

The apparatus may also be configured to operate in a fourth state. The fourth state may be triggered, at least in part, in response to a termination of communication between the data center and the branch processor, and the desktop application and the branch processor.

In the fourth state, the branch processor application server may remain operational in a degraded mode. The degraded mode may include the branch processor application server performing limited capabilities.

The limited capabilities performed by the branch processor may include cash withdrawals up to a predetermined amount. The limited capabilities may also include depositing of funds. The limited capabilities may also include issuing a cashier's check up to a predetermined amount. The limited capabilities may vary, and may be determined by a supervisor.

A supervisor may also determine what capabilities can be performed depending on prior experiences the supervisor has had with a specific customer.

It should be appreciated that the apparatus states described above need not occur in the order described. Rather, depending on the circumstances, the level of communications, and any other suitable factors, the states may occur in a different order.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of branch processing device system 100 based on a computer 101. The computer 101 may have a processor 103 for controlling the operation of the branch processing device system 100, and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other branch processing device systems via a LAN interface 113.

System 100 may operate in a networked environment supporting connections to one or more remote computers, such as terminals 141 and 151. Terminals 141 and 151 may be personal computers or servers that include many or all of the elements described above relative to branch processing device system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other mobile devices.

Figure 2:
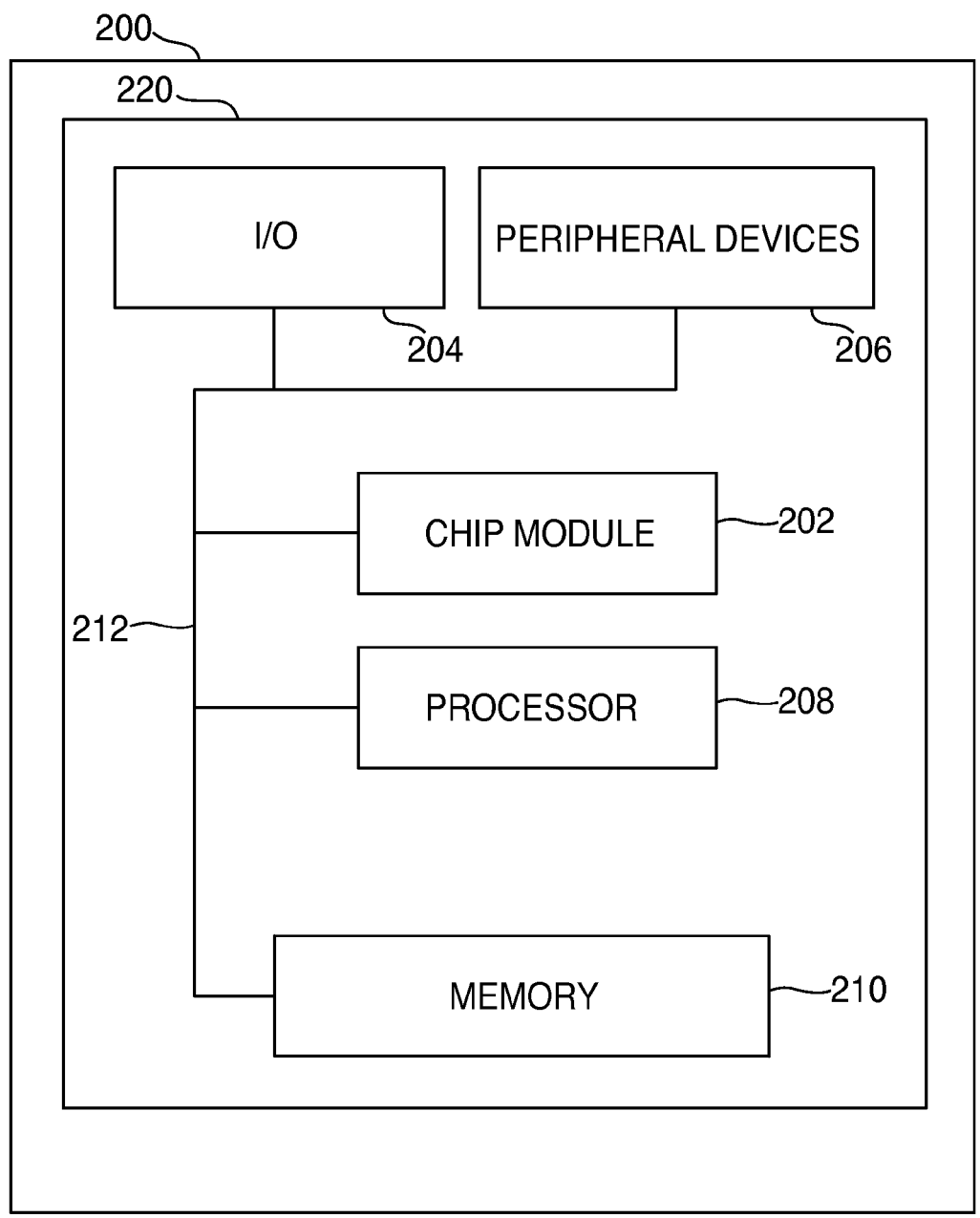
FIG. 2 shows an illustrative apparatus in accordance with the principles of the invention.

FIG. 2 shows illustrative apparatus 200. Apparatus 200 may be a computing machine. Apparatus 200 may include one or more features of the branch processing device system 100 shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, transaction information; and machine-readable memory 210.

Machine-readable memory 210 may be configured to store in machine-readable data structures: transaction identification numbers, batch identification numbers, the current time, information pertaining to account holders and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network.

In a distributed computing environment, program modules may be located in both local and remote computer storage media including memory storage devices. In a distributed computing environment, devices that perform the same or similar function may be viewed as being part of a "module" even if the devices are separate (whether local or remote) from each other.

Figure 3:
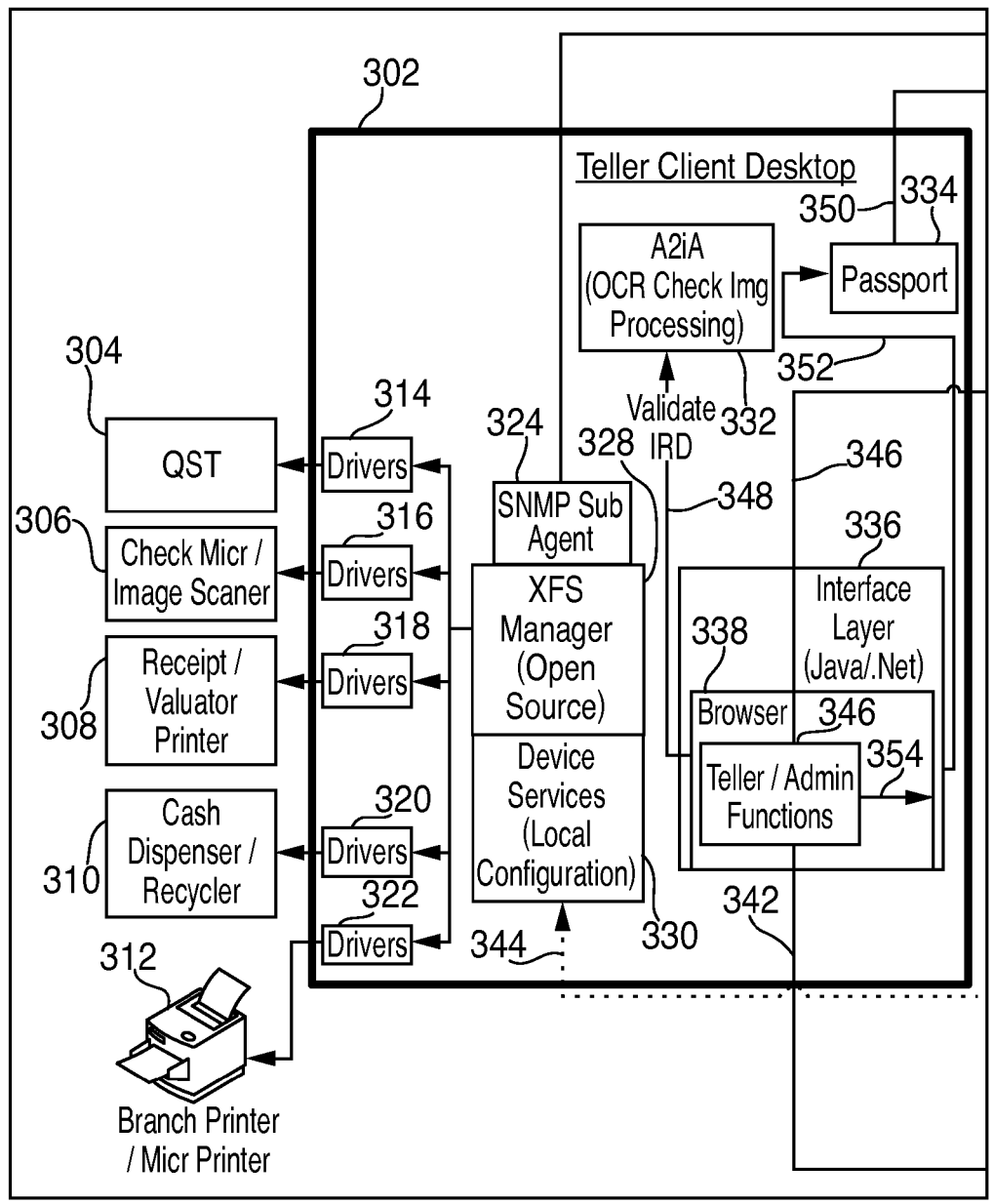
FIG. 3 shows an illustrative diagram in accordance with the principles of the invention.

FIG. 3 shows teller client desktop application 302 (hereinafter, "desktop application") with exemplary components. Desktop application 302 may be located in a banking center. Desktop application 302 may be used by a teller. The teller may perform a transaction for a customer using desktop application 402. Desktop application 302 may include hardware, such as a computer workstation, and software.

In some embodiments, desktop application 302 may also be located at an Automatic Teller Machine ("ATM"). An ATM may be located at a banking center. An ATM may also be located near a banking center, for example, in a banking center parking lot.

Desktop application 302 may include device services (local configuration) 330. Device services (local configuration) may enable a user of desktop application 302 to use a shared device. Device services (local configuration) may receive information from device application services (not shown) via communication line 344. The received information may give the user access to specific shared devices.

The received information may also change the permissions of the user to access specific shared devices. It should be appreciated that QST 304, check micr/image scanner 306, receipt/valuator printer 308, cash dispenser/recycler 310 and branch printer/micr printer 312 may be shared devices, which can be accessed by more than one user.

Extensions for financial services ("XFS") manager 328 may serve as a go-between with drivers 314, 316, 318, 320 and 322, and device services 330. XFS manager may manage the shared devices. XFS manager may also determine how desktop application 302 can and/or should engage with the shared devices.

Device services (local configuration) 330 may communicate with drivers 314, via XFS manager 328. Drivers 314 may provide access to QST 304. QST 304 may be defined as a quick service terminal. A quick service terminal may include a card swipe, a numeric input or any other suitable device. Permissions to access the QST may be provided to customers initiating a transaction. The device services (local configuration) 330 may allow for a user to use the QST device, provided that the user is a customer initiating a transaction. In some embodiments, the device services (local configuration) 330 may restrict usage of the QST device to a potential user who has completed a transaction.

Device services (local configuration) 330 may also communicate with drivers 316, via XFS manager 328. Drivers 316 may provide access to check micr/image scanner 306. Permissions to access check micr/image scanner 306 may be provided to a teller engaged in assisting a customer deposit a check. In certain embodiments, check micr/image scanner 306 may be found in Automatic Teller Machines ("ATM").

Device services (local configuration) 330 may also communicate with drivers 318, via XFS manager 328. Drivers 318 may provide access to receipt/valuator printer 308. Permissions to access the receipt/valuator printer 308 may be determined by device services 330. Permission may be given to a teller, or a customer who prints a receipt of a transaction. Receipt/valuator printer 308 may also be found in an ATM.

Device services (local configuration) 330 may also communicate with drivers 320, via XFS manager 328. Drivers 320 may provide access to cash dispenser/recycler 310. Permissions to access cash dispenser/recycler 310 may be determined by device services. Permissions may be given to a teller, or customer who may deposit, or withdraw, cash during a transaction.

Device services (local configuration) 330 may also communicate with drivers 322, via XFS manager 328. Drivers 322 may provide access to branch printer/micr Printer 312. Permissions to access branch printer/micr printer 312 may be determined by device services. Permissions may be given to a teller, or a customer, who may print a statement.

SNMP (Simple Network Management Protocol) sub agent 324 may be a hardware exception handling protocol. SNMP sub agent may determine or receive notification, when a printer device runs out of paper. SNMP sub agent may also determine or receive notification, when a device jams or a cash dispenser device depleted its cash. SNMP sub agent 324 may communicate with XFS manager. SNMP sub agent may also communicate with XFS (not shown) via communication line 326.

Desktop application 302 may also include browser 338. Browser 338 may allow a user to access the internet—e.g., for the purpose of accessing an online banking service. Desktop application 302 may also include teller/admin functions 340. teller/admin functions 340 may interact with browser 338 via connection 354. Teller/admin functions 340 may also communicate, via communication line 346, with a branch processor (not shown). Teller/admin functions 340 may also communicate with a teller application server via communication line 342.

Interface layer (Java®/.Net) 336 may enable browser 338 to communicate with the internet by providing the necessary protocols. The protocols used to communicate with browser 338 may be Java®. The protocols used to communicate with browser 338 may be Microsoft® .Net Framework.

Browser 338 may communicate with A2iA (OCR check image processing) 332, via communication line 348. A2iA®, a check image processing company, 332 may validate a check. In order for a check to be validated by A2iA®, the check should preferably include the required components of an IRD ("Image Replacement Document") document. If A2iA® determines that a check includes the required components of an IRD document, the check may be validated.

When a check is validated, the relevant information may be transmitted to browser 338. The relevant information may then be transferred from browser 338 to interface layer 336. The relevant information may then be transferred from interface layer 336 to passport 334, via communication line 352. Passport 334 may convert the check to an IRD electronic document. Passport 334 may transmit the IRD electronic document to ULZ ("Universal Landing Zone") (not shown), via communication line 350. Passport 334 may provide a response to interface layer 336 regarding the authorization of the check.

Figure 4:
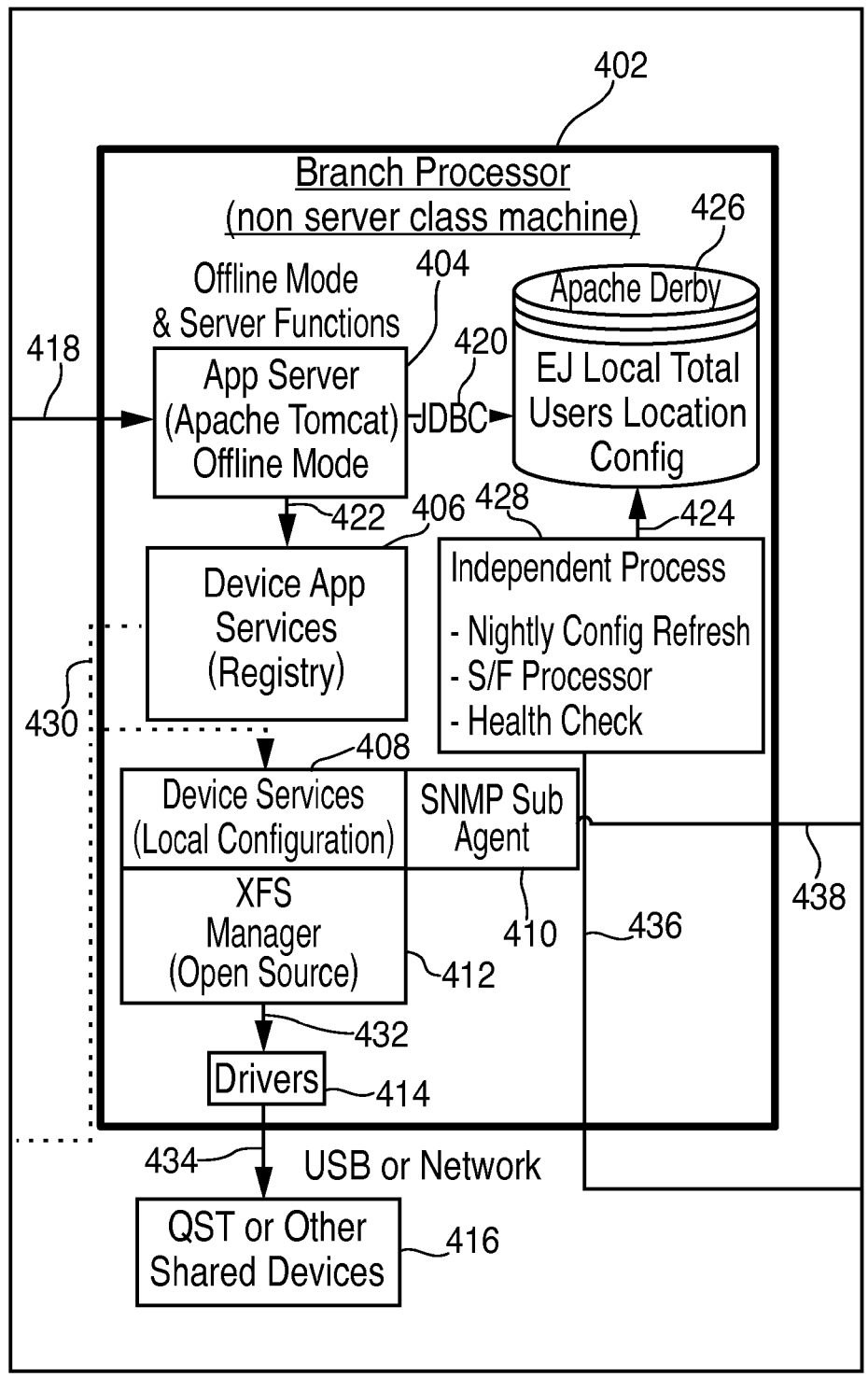
FIG. 4 shows an illustrative diagram in accordance with the principles of the invention.

FIG. 4 shows branch processor 402 with exemplary components. Branch processor 402 may include device application services (registry) 406. Device application services (registry) 406 may identify what types of devices are available. Device application services (registry) may also identify what denominations are contained in a cash recycler. Device application services (registry) may also identify how many devices are available, etc. Device application services (registry) 406 may communicate, via communication line 430, with a device services (local configuration) (not shown). device application services (registry) 406 may also communicate with device services (local configuration) 408, via communication line 430. XFS manager 412 may be a device manager. XFS manager may act as a go-between between the device services (local configuration) 408 and drivers 414, using communication line 432. Drivers 414 may provide access to QST or other shared devices 416, via communication line 434.

Branch processor may also include SNMP sub agent 410. SNMP sub agent 410 may be a hardware exception handler. SNMP sub agent 410 may communicate with extended messaging services ("XMS") (not shown), via communication line 438.

It should be appreciated that Branch processor 402 includes all the necessary components to execute the tasks performed by a desktop application. These components include device services (local configuration) 408, XFS manager 412, drivers 414 and communication line 434, SNMP sub agent 410 and branch processor 402.

Branch processor 402 may include application server (apache Tomcat™) offline mode 404. Application server may be a processor which enables branch processor 402 to remain active during service degradation. Application server 404 may have degraded, or offline mode capabilities. These capabilities may include withdrawal of cash, up to a predetermined amount; deposit of checks; and cashing of checks, up to a predetermined amount; and/or any suitable capabilities in degraded mode. Application server 404 may communicate with device application 406, via communication line 422. Application server may receive communications from teller/admin functions (not shown) via communication line 418. Application server 404 may also communicate with Electronic Journal ("EJ") 426, via protocol JDBC (Java® database connectivity) 420.

EJ 426 may record and save substantially all transactions that occur in branch processor 402. The contents of EJ 426 may be transmitted to a data center (not shown) when application server 404 is operated in a degraded mode.

Branch Processor 402 may also include independent process 428. Independent process 428 may monitor the health of the processor itself, as well as perform a nightly configuration refresh. A nightly configuration refresh may be independent process 428 restart and/or reconfigure the processor. Independent process 428 may also communicate with EJ 426, via communication line 424. Independent process 428 may also communicate with a teller application server at a data center (not shown) via communication line 436.

Figure 5:
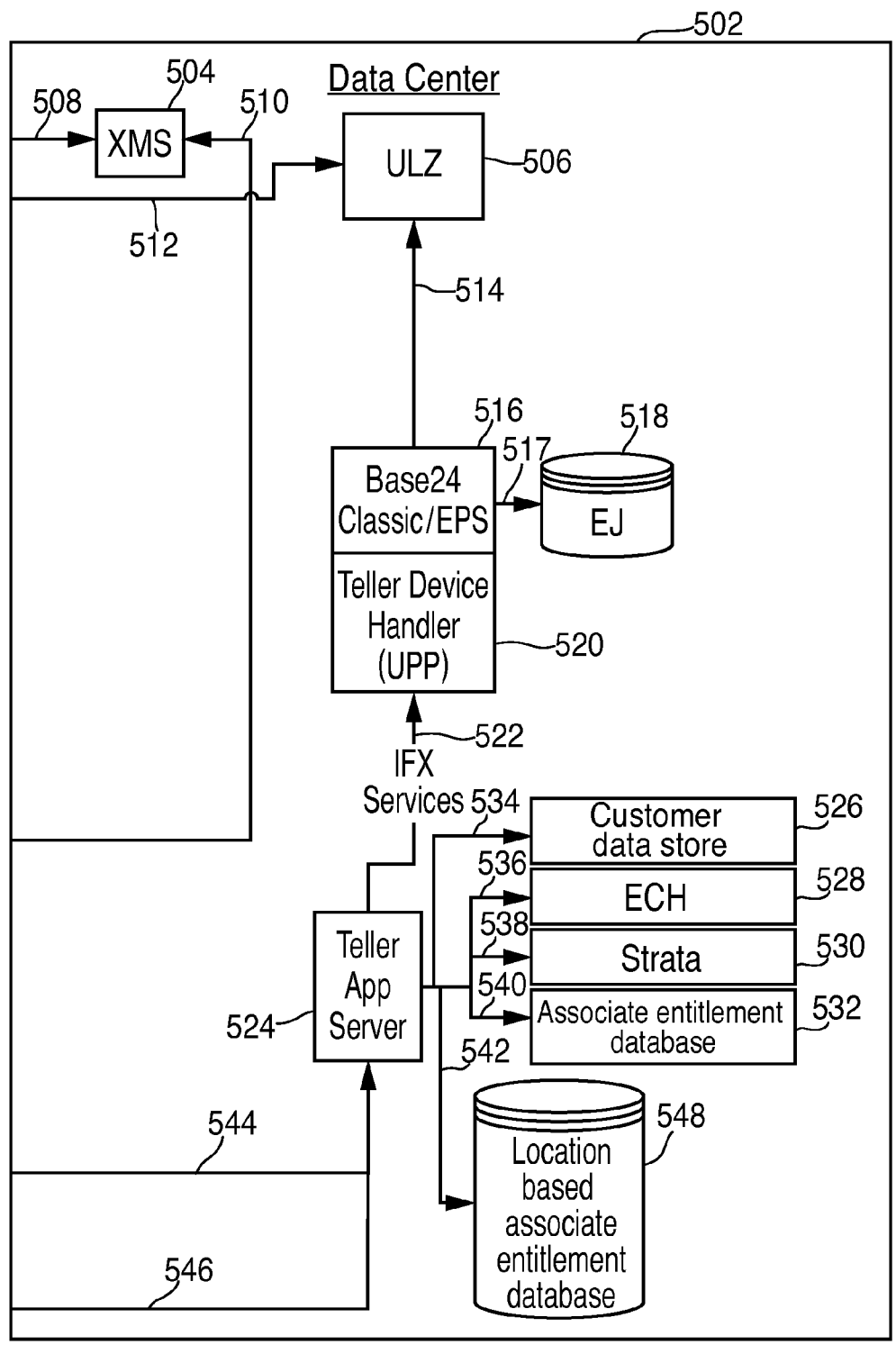
FIG. 5 shows an illustrative diagram in accordance with the principles of the invention.

FIG. 5 shows data center 502 with exemplary components. Data center 502 may include XMS 504. XMS 504 may communicate with SNMP, via communication lines 508 and 510. SNMP, as described above, may be located on a desktop application (not shown) or a branch processor (not shown). XMS may transmit messages to SNMP located on the branch processor and the desktop application.

Data center 502 may include ULZ 506. ULZ 506 may enable transfer of money between different financial institutions. ULZ may also enable transfer of money within a financial institution. ULZ 506 may receive instructions to transfer money from Passport, via communication line 512. ULZ 506 may also receive IRD documents from passport via communication line 512. Passport may be located on a desktop application, as described above. ULZ may also receive transfer instructions from Base24 Classic/EPS 516 via communication line 514.

Base24 Classic/EPS 516 may be a server. Base24 516 may transmit substantially all transactions to EJ 518 via communication line 517. EJ 518 may record and save substantially all transactions received. Base24 516 may be connected to Teller Device Handler (Universal Payment Platform ("UPP")) 520. Financial Messaging Protocol ("IFX") services 522 may be customized to create a customized IFX device handler. A customized IFX device handler may allow for commercial deposits, dozens of check deposits and degraded server mode.

Using conventional UPP tools, IFX services 522 may be transmitted from teller application server 524. Teller application server 524 may be a server. Teller application server 524 may identify the distribution of cash at any given moment at substantially all branch processors and teller client desktops. Communication lines 544 may link branch processors with teller application server 524. Communication lines 546 may link desktop applications with teller application server 524.

Teller application server 524 may communicate with customer data store 526 via communication line 534. WCC 526 may include the capabilities to identify account information. The account information may be account information which occurred today.

Teller application server 524 may communicate via communication line 536 with ECH 528. ECH 528 may store data for an entire financial institution. Using ECH 528, the teller application server may identify account data regardless of where the transaction occurred.

Teller application server 524 may communicate via communication line 538 with Strata 530. Strata 530 may store images. Strata 530 may also store images regarding signatures of customers. The saved signatures of customers may be used for verification of customer signatures.

Teller application server 524 may communicate with associate entitlements 532 via communication line 540. Associate entitlements 532 may include entitlements and identification of associates.

Teller application server 524 may also communicate with location-based associate entitlements 548 via communication line 542.

Figure 6:
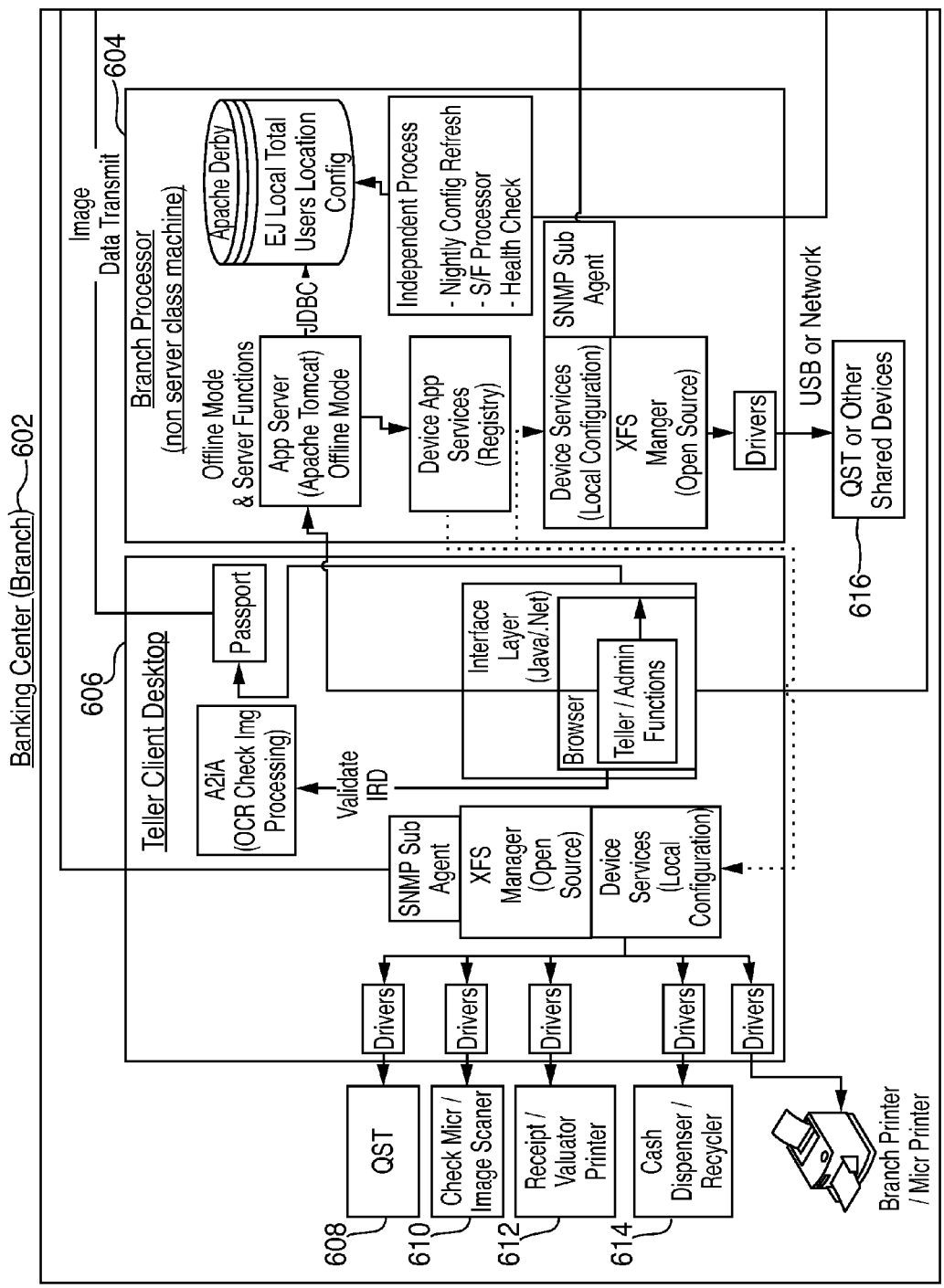
FIG. 6 shows an illustrative diagram in accordance with the principles of the invention.

FIG. 6 shows banking center (branch) 602. Banking center (branch) 602 may include branch processor 604. Banking center (branch) 602 may also include desktop application 606. Banking center (branch) 602 may also include shared devices, including QST 606, check micr/image scanner 610, receipt/valuator printer 612, cash dispenser/recycler 614 and QST or other shared devices 616. Banking center (branch) 602 may include more than one branch processor. Banking center (branch) 602 may also include more than one desktop application. The shared devices, as described above, may be used by multiple desktop applications and branch processors in a banking center.

Figure 7:
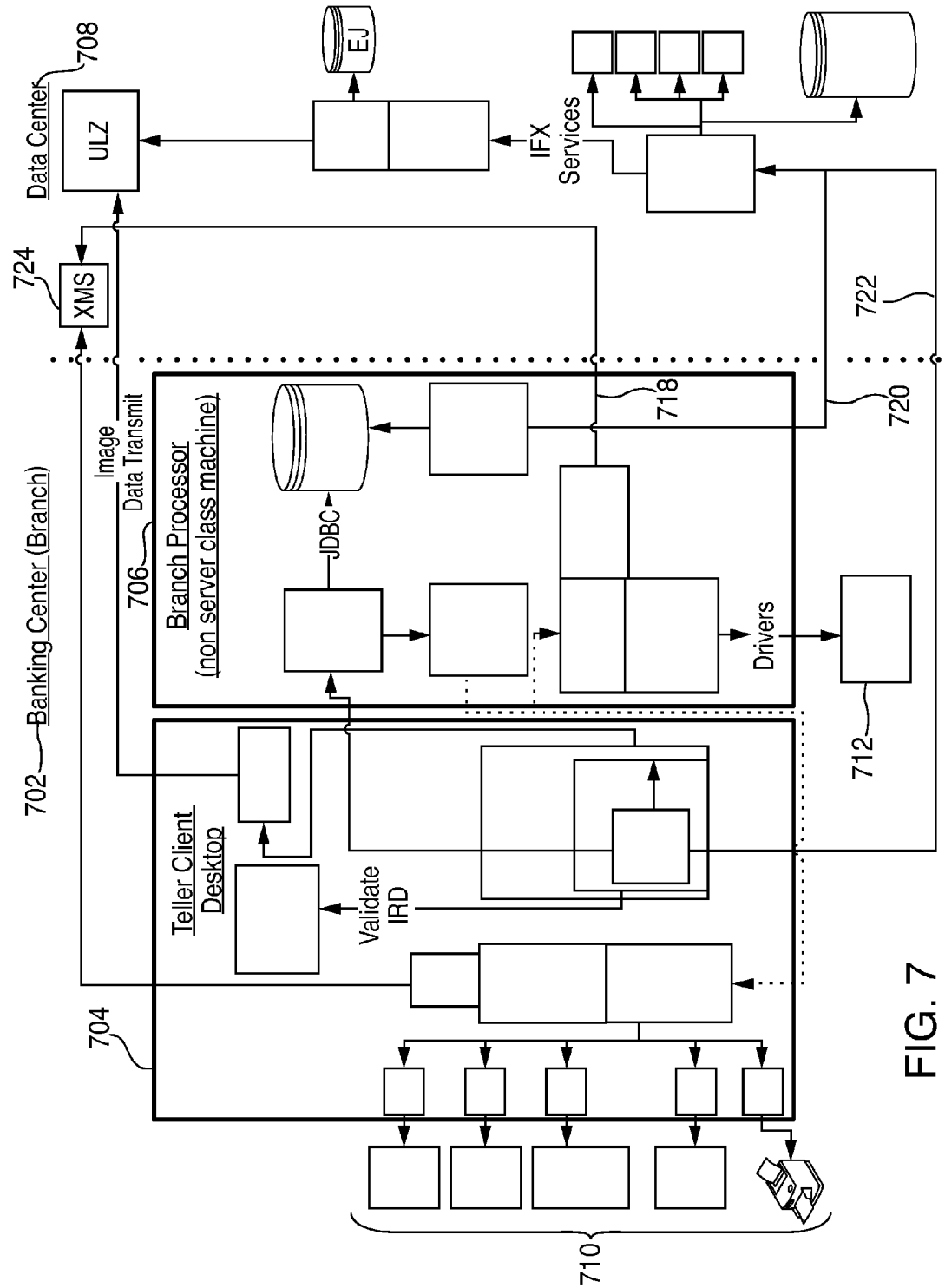
FIG. 7 shows an illustrative diagram in accordance with the principles of the invention.

FIG. 7 shows a high level view of a banking center. Banking center (branch) 702 may include desktop applications 704. Desktop application 704 may include many components, as described in further detail in FIG. 3. The components may include a workstation computer, an image recognition engine and an image data transformation module. Desktop application 704 may also include a component for managing local or remote shared devices. Desktop application 704 may also include a device manager, which may be an XFS device manager, a connection to a device capable of remotely diagnosing problems in the teller client desktop and a hardware exception device handler, which may be an SNMP sub agent. Desktop application 704 may also include a lightweight interface layer for desktop components. Desktop application 704 may also include an anti-virus agent.

Desktop application 704 may include drivers, which may be used to interface with devices 710. Devices 710 may include, inter alia, a branch printer, a cash recycler, a receipt printer, and a check/image scanner.

Banking center (branch) 702 may include branch processor 706. Branch processor 706 may include many components, including a server, a database and a component for managing local or remote shared devices. The branch processor 706 may include a remote device manager, which may be an XFS device manager. The branch processor may also include an application server for off-line support. The application server has been described above in the portion of the specification corresponding to FIG. 4.

The banking center (branch) 702 may be linked, via protocols, or any other suitable communication links, to data center 708. Data center 708 may include many components, including a server, a database, and a device handler. The device handler may be a teller device handler, which has been described above in FIG. 5.

Communication lines 716 and 718 may link SNMP, which has been described above in FIGS. 4 and 5, to XMS 724. XMS 724 may be located in data center 708.

Communication line 714 may link passport to ULZ. Passport may receive electronic information regarding a check. Passport may also convert the electronic check information to an IRD electronic document. The IRD electronic document may be a document that ULZ accepts. Communication line 714 may transmit an IRD electronic document from passport to ULZ, which has been described above in FIG. 5.

Communication 720 may link a server in branch processor 706 to a server in data center 708. The server in data center 708 may be a teller application server. The teller application server may identify the distribution of cash at banking center 702. The teller application server may also identify the distribution of cash at other banking centers. The identification may occur at any given moment provided that there is no service degradation in the communications traveling across communication line 720.

Communication line 722 may link a workstation in desktop application 704 to a server in data center 308. The server in data center 708 may be a teller application server. The teller application server may identify the distribution of cash at banking center 702. The teller application server may also identify the distribution of cash at desktop application 704. The teller application server may also identify the distribution of cash at any other teller application server. The identification may occur at any given moment provided that there is no service degradation in the communications traveling across communication line 720.

Figure 8:
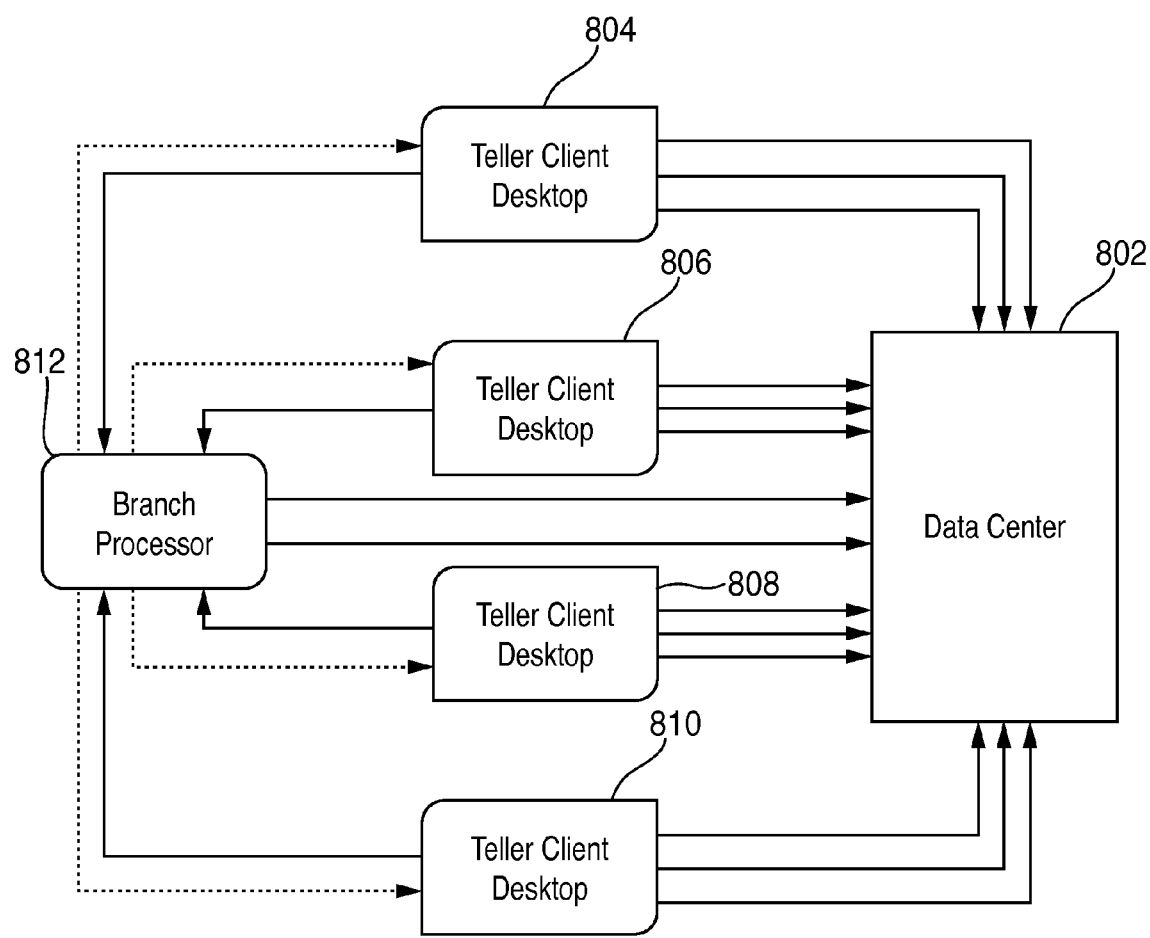
FIG. 8 shows an illustrative diagram in accordance with the principles of the invention.

FIG. 8 shows data center 802, which may communicate with branch processor 812, and with desktop applications 804, 806, 808 and 810. Branch processor 812 may communicate with desktop applications 804, 806, 808 and 810. It should be appreciated that the communications are merely exemplary and are not limited to those shown in FIG. 8.

Figure 9:
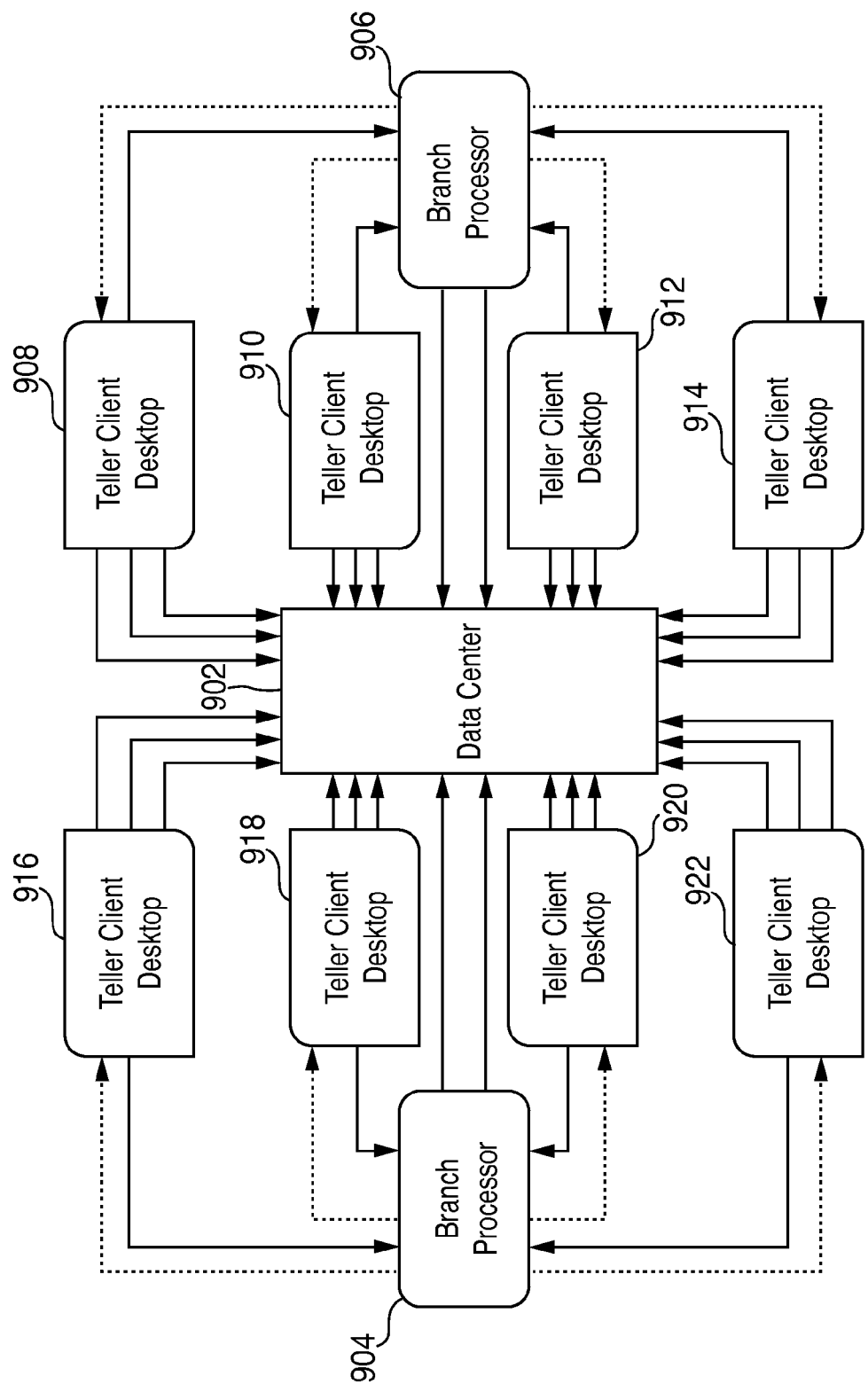
FIG. 9 shows an illustrative diagram in accordance with the principles of the invention.

FIG. 9 shows data center 902, which may be in communication with branch processors 904 and 906, and desktop applications 908, 910, 912, 914, 916, 918, 920 and 922.

In addition, branch processors 904 and 906 may be in communication with desktop applications 908, 910, 912, 914, 916, 918, 920 and 922, as shown in FIG. 9.

It should be appreciated that a single data center may be in linked to many branch processors and many desktop applications. It should also be appreciated that the configurations and architectures which have been described above are merely exemplary, and there may be numerous ways for the disclosure to be constructed.

Thus, methods and apparatus for invoking a degraded mode architecture are provided. Persons skilled in the art will appreciate that the present invention can be practiced by other than the described embodiments, which are presented for purposes of illustration rather than of limitation, and that the present invention is limited only by the claims that follow.

What is claimed is:

1. An apparatus for invoking a degraded mode architecture comprising:
   a branch processor comprising:
      a branch processor application server for performing computing and networking activities;
      a branch processor electronic journal for saving activities performed by the branch processor application server;
      a process-monitor for monitoring a condition of the branch processor;
   a desktop application comprising:
      a workstation for performing user functions and administrative functions, said workstation comprising:
         a browser; and
         an interface layer;
      an optical character recognition ("OCR") image processor;
      an application for converting an image to an image replacement document ("IRD");
   wherein:
   the desktop application is configured to interface with a plurality of shared branch devices, the desktop application comprising:
      a desktop application device application services registry configured to identify a plurality of shared devices available for use, wherein when one of the devices is a cash dispenser, the desktop application device application services registry is further configured to monitor the denominations of currency that are available for dispensing;
      desktop application device services for local configuration configured to:
         identify permissions required to access each of the plurality of shared devices;
         enable a user of the desktop application to access one of the plurality of shared devices by communicating with a device driver via a device manager;
      a desktop application device manager configured to associate a plurality of device drivers with desktop application device services for local configuration;
      a desktop application hardware device exception handler configured to implement a Simple Network Management Protocol sub agent to identify a malfunction associated with one of the plurality of shared devices; and the plurality of device drivers, wherein said drivers are configured to interact with the plurality of shared devices and the desktop application device manager; and the branch processor comprises duplicate components configured to execute a plurality of tasks performed by the desktop application to interface with the plurality of shared branch devices when there is a termination of communication between the desktop application and the branch processor, the duplicate components comprising:

a branch processor device application services registry configured to identify the a plurality of devices available for use, wherein when one of the devices is a cash dispenser, the branch processor device application services registry is further configured to monitor the denominations of currency that are available for dispensing;

branch processor device services for local configuration configured to:
identify permissions required to access each of the plurality of shared devices;
enable a user of the desktop application to access one of the plurality of shared devices by communicating with a device driver via a device manager;

a branch processor device manager configured to associate a plurality of device drivers with branch processor device services for local configuration;

a branch processor hardware device exception handler configured to implement a Simple Network Management Protocol sub agent to identify a malfunction associated with one of the plurality of shared devices; and the plurality of branch processor drivers, wherein said drivers are configured to interact with the plurality of shared devices and the branch processor device manager; and a data center comprising:
a data center hardware-device exception handler;
a universal landing zone ("ULZ") for accepting an IRD;
a data center server;
a data center electronic journal;
a data center application server that interacts with a customer data store, a customer event hub ("ECH"), an image database ("Strata"), an associate entitlement database, and a location based associate entitlement database;

wherein in a first state:
the branch processor application server is fully operational;
the workstation is in communication with the data center application server;
the workstation is in communication with the branch processor application server;
the device application services registry is in communication with the desktop application device services for local configuration;
the desktop application hardware-device exception handler is in communication with the data center hardware-device exception handler;
the branch processor hardware-device exception handler is in communication with the data center hardware-device exception handler;
the application for converting an image to an IRD is in communication with the ULZ;
the process-monitor is in communication with the data center application server;
the data center electronic journal receives activities that occurred in the desktop application, via the data center application server and the workstation;
the data center electronic journal receives activities that occurred in the branch processor, via the data center application server the process-monitor, and the branch processor electronic journal;
the data center electronic journal saves the received activities;

wherein in a second state:
the branch processor application server operates with limited capabilities;
the device application services registry is in communication with the desktop application device services for local configuration;
the workstation is in communication with the branch processor application server;
the branch processor electronic journal receives activities that occurred in the desktop application, via the branch processor application server;
the branch processor electronic journal receives activities that occurred in the branch processor, via the branch processor application server and the workstation;
the electronic journal in the branch processor saves the received activities;

wherein in a third state:
the branch processor application server is fully operational;
the workstation is in communication with the data center application server;
the workstation is in communication with the branch processor application server;
the device application services registry is in communication with the desktop application device services for local configuration;
the desktop application hardware-device exception handler is in communication with the data center hardware-device exception handler;
the branch processor hardware-device exception handler is in communication with the data center hardware-device exception handler;
the application for converting an image to an IRD is in communication with the ULZ;
the process-monitor is in communication with the data center application server;
the branch processor electronic journal transmits the saved activities to the data center electronic journal;
the data center electronic journal receives the saved activities from the branch processor electronic journal;
the data center electronic journal saves the received activities wherein a fourth state is triggered, at least in part, in response to a termination of communication between:
the data center and the branch processor; and
the desktop application and the branch processor;
wherein in the fourth state:
the branch processor application server remains operational in a degraded mode.

2. The apparatus of claim 1, wherein the limited capabilities performed by the branch processor comprise cash withdrawals up to a predetermined amount.

3. The apparatus of claim 1, wherein the limited capabilities performed by the branch processor comprise depositing funds.

4. The apparatus of claim 1, wherein the limited capabilities performed by the branch processor comprise issuing a cashier's check up to a predetermined amount.

5. An apparatus for invoking a degraded mode architecture comprising:
a branch processor comprising:
a branch processor application server for performing computing and networking activities;
a branch processor electronic journal for saving activities performed by the branch processor application server;
a process-monitor for monitoring a condition of the branch processor;
a desktop application comprising:
a workstation for performing user functions and administrative functions, said workstation comprising:
a browser; and
an interface layer;
an optical character recognition ("OCR") image processor;
an application for converting an image to an image replacement document ("IRD");
wherein:
the desktop application comprises apparatus configured to interface with a plurality of shared branch devices, the apparatus comprising:
a desktop application device application services registry configured to identify a plurality of shared devices available for use, wherein when one of the devices is a cash dispenser, the desktop application device application services registry is further configured to monitor the denominations of currency that are available for dispensing;
desktop application device services for local configuration configured to:
identify permissions required to access each of the plurality of shared devices;
enable a user of the desktop application to access one of the plurality of shared devices by communicating with a device driver via a device manager;
a desktop application device manager configured to associate a plurality of device drivers with desktop application device services for local configuration;
a desktop application hardware device exception handler configured to implement a Simple Network Management Protocol sub agent to identify a malfunction associated with one of the plurality of shared devices; and
the plurality of device drivers, wherein said drivers are configured to interact with the plurality of shared devices and the desktop application device manager; and
the branch processor comprises duplicate components configured to execute a plurality of tasks performed by the desktop application to interface with the plurality of shared branch devices when there is a termination of communication between the desktop application and the branch processor, the duplicate components comprising:
a branch processor device application services registry configured to identify the a plurality of devices available for use, wherein when one of the devices is a cash dispenser, the branch processor device application services registry is further configured to monitor the denominations of currency that are available for dispensing;
branch processor device services for local configuration configured to:
identify permissions required to access each of the plurality of shared devices;
enable a user of the desktop application to access one of the plurality of shared devices by communicating with a device driver via a device manager;
a branch processor device manager configured to associate a plurality of device drivers with branch processor device services for local configuration;
a branch processor hardware device exception handler configured to implement a Simple Network Management Protocol sub agent to identify a malfunction associated with one of the plurality of shared devices; and
the plurality of branch processor drivers, wherein said drivers are configured to interact with the plurality of shared devices and the branch processor device manager; and
a data center comprising:
a data center hardware-device exception handler;
a universal landing zone ("ULZ") for accepting an IRD;
a data center server;
a data center electronic journal;
a data center application server that interacts with a customer data store, a customer event hub ("ECH"), an image database ("Strata"), an associate entitlement database, and a location based associate entitlement database;
wherein in a first state:
the branch processor application server is fully operational;
the workstation is in communication with the data center application server;
the workstation is in communication with the branch processor application server;
the device application services registry is in communication with the desktop application device services for local configuration;
the desktop application hardware-device exception handler is in communication with the data center hardware-device exception handler;
the branch processor hardware-device exception handler is in communication with the data center hardware-device exception handler;
the application for converting an image to an IRD is in communication with the ULZ;
the process-monitor is in communication with the data center application server;
the data center electronic journal receives activities that occurred in the desktop application, via the data center application server and the workstation;
the data center electronic journal receives activities that occurred in the branch processor, via the data center application server the process-monitor, and the branch processor electronic journal;
the data center electronic journal saves the received activities,
wherein in a second state:
the branch processor application server operates with limited capabilities;

the device application services registry is in communication with the desktop application device services for local configuration;

the workstation is in communication with the branch processor application server;

the branch processor electronic journal receives activities that occurred in the desktop application, via the branch processor application server;

the branch processor electronic journal receives activities that occurred in the branch processor, via the branch processor application server and the workstation; and the electronic journal in the branch processor saves the received activities.

6. The apparatus of claim 5, further comprising a third state, wherein in a third state:

the branch processor application server is fully operational;

the workstation is in communication with the data center application server;

the workstation is in communication with the branch processor application server;

the device application services registry is in communication with the desktop application device services for local configuration;

the desktop application hardware-device exception handler is in communication with the data center hardware-device exception handler;

the branch processor hardware-device exception handler is in communication with the data center hardware-device exception handler;

the application for converting an image to an is in communication with the ULZ;

the process-monitor is in communication with the data center application server;

the branch processor electronic journal transmits the saved activities to the data center electronic journal;

the data center electronic journal receives the saved activities from the branch processor electronic journal; and the data center electronic journal saves the received activities.

7. The apparatus of claim 5, further comprising a fourth state, wherein the fourth state is triggered, at least in part, in response to a termination of communication between:

the data center and the branch processor; and the desktop application and the branch processor;

wherein in the fourth state:

the branch processor application server remains operational in a degraded mode.

8. The apparatus of claim 5, wherein the limited capabilities performed by the branch processor comprise cash withdrawals up to a predetermined amount.

9. The apparatus of claim 5, wherein the limited capabilities performed by the branch processor comprise depositing funds.

10. The apparatus of claim 5, wherein the limited capabilities performed by the branch processor comprise issuing a cashier's check up to a predetermined amount.

11. One or more non-transitory computer-readable media storing computer-executable instructions which, when executed by a processor on a computer system, perform a method for invoking degraded mode architecture, wherein the architecture comprises a branch processor, the branch processor comprising a branch processor application server for performing computing and networking activities, a branch processor electronic journal for saving activities performed by the branch processor application server, a process-monitor for monitoring a condition of the branch process, a device application services registry for determining device information and user permissions pertaining to a plurality of shared devices, branch processor device services for local configuration for implementing the device information and user permissions, a branch processor device manager for associating a plurality of branch processor drivers with the branch processor device services for local configuration, a branch processor hardware-device exception handler for managing exceptions in the shared devices, and the plurality of branch processor drivers, wherein the architecture further comprises a desktop application, the desktop application comprising a workstation for performing user functions and administrative functions, an optical character recognition ("OCR") image processor, an application for converting an image to an image replacement document ("IRD"), desktop application device services for local configuration, a desktop application device manager, a desktop application hardware-device exception handler, a plurality of desktop application drivers, wherein the architecture further comprises a data center, the data center comprising a data center hardware-device exception handler, a universal landing zone ("ULZ") for accepting an IRD, a data center server, a data center electronic journal, and a data center application server that interacts with a customer data store, a customer event hub ("ECH"), an image database ("Strata"), an associate entitlement database, and a location based associate entitlement database, the method comprising:

performing computing and networking activities using the branch processor application server;

saving activities that were performed by the branch processor application server on the branch processor electronic journal;

monitoring the condition of the branch processor using the process-monitor;

determining device information and user permissions pertaining to the plurality of shared devices at the device application services registry;

implementing the device information and user permissions using the branch processor device services for local configuration;

associating the plurality of branch processor drivers with the branch processor device services for local configuration using the branch processor device manager;

managing exceptions in the shared devices using the branch processor hardware-device exception handler;

interacting each of said plurality of shared devices with the branch processor device manager using the plurality of branch processor drivers;

performing user functions and administrative functions on the workstation, said workstation comprising a browser and an interface layer;

performing optical character recognition image processing at the OCR image processor;

converting an image to an IRD at the conversion application;

implementing the device information and user permissions using the desktop application device services for local configuration;

associating the plurality of desktop application drivers with the desktop application device services for local configuration using the desktop application device manager;

managing exceptions in the shared devices using the desktop application hardware-device exception handler;

interacting each of said plurality of shared devices with the desktop application device manager using the plurality of desktop application drivers, located at the desktop application;

managing exceptions in the shared devices using the data center hardware-device exception handler;

accepting an IRD at the ULZ;

performing computing instructions at the data center server;

saving activities that were performed by the branch processor application server and the desktop application workstation, on the data center electronic journal;

associating the data center application server with the database;

wherein the computer system is configured to operate in a first state:
  the branch processor application server is fully operational;
  the workstation is in communication with the data center application server;
  the workstation is in communication with the branch processor application server;
  the device application services registry is in communication with the desktop application device services for local configuration;
  the desktop application hardware-device exception handler is in communication with the data center hardware-device exception handler;
  the branch processor hardware-device exception handler is in communication with the data center hardware-device exception handler;
  the application for converting an image to an IRD is in communication with the ULZ;
  the process-monitor is in communication with the data center application server;
  the data center electronic journal receives activities that occurred in the desktop application, via the data center application server and the workstation;
the data center electronic journal receives activities that occurred in the branch processor, via the data center application server the process-monitor, and the branch processor electronic journal;
  the data center electronic journal saves the received activities;
wherein the computer system is configured to operate in a second state:
  the branch processor application server operates with limited capabilities;
  the device application services registry is in communication with the desktop application device services for local configuration;
  the workstation is in communication with the branch processor application server;
  the branch processor electronic journal receives activities that occurred in the desktop application, via the branch processor application server;
  the branch processor electronic journal receives activities that occurred in the branch processor, via the branch processor application server and the workstation;
  the electronic journal in the branch processor saves the received activities;
wherein the computer system is configured to operate in a third state:
  the branch processor application server is fully operational;
  the workstation is in communication with the data center application server;
  the workstation is in communication with the branch processor application server;
  the device application services registry is in communication with the desktop application device services for local configuration;
  the desktop application hardware-device exception handler is in communication with the data center hardware-device exception handler;
  the branch processor hardware-device exception handler is in communication with the data center hardware-device exception handler;
  the application for converting an image to an IRD is in communication with the ULZ;
  the process-monitor is in communication with the data center application server;
  the branch processor electronic journal transmits the saved activities to the data center electronic journal;
  the data center electronic journal receives the saved activities from the branch processor electronic journal;
  the data center electronic journal saves the received activities
wherein the computer system is configured to operate in a fourth state, the fourth state being triggered, at least in part, in response to a termination of communication between:
  the data center and the branch processor; and
  the desktop application and the branch processor;
wherein in the fourth state:
  the branch processor application server remains operational in a degraded mode.

12. The media of claim 11, wherein the limited capabilities performed by the branch processor comprise cash withdrawals up to a predetermined amount.

13. The media of claim 11, wherein the limited capabilities performed by the branch processor comprise depositing funds.

14. The media of claim 11, wherein the limited capabilities performed by the branch processor comprise issuing a cashier's cheek up to a predetermined amount.

* * * * *